United States Patent [19]

Fujiwara

[11] 4,181,932

[45] Jan. 1, 1980

[54] POWER CONVERTER

[75] Inventor: Masakatsu Fujiwara, Kawasaki, Japan

[73] Assignee: Fuji Electric Co., Ltd., Kawasaki, Japan

[21] Appl. No.: 817,466

[22] Filed: Jul. 20, 1977

[30] Foreign Application Priority Data

Jul. 21, 1976 [JP] Japan .................................. 51-86754

[51] Int. Cl.$^2$ ............................................. H02M 7/00
[52] U.S. Cl. ........................................ 363/68; 363/84
[58] Field of Search ....................... 363/65, 67, 68, 69, 363/70, 84–85 86, 72, 74

[56] References Cited

U.S. PATENT DOCUMENTS

| Re. 29,560 | 2/1978 | Frank et al. | 363/71 |
|---|---|---|---|
| 3,562,624 | 2/1971 | Ullman | 363/72 |
| 3,622,862 | 11/1971 | Boksjo | 363/54 |
| 3,641,356 | 2/1972 | Ekstrom | 307/84 X |
| 3,953,781 | 4/1976 | Forster et al. | 363/70 |
| 4,020,411 | 4/1977 | Tsuboi et al. | 363/68 |
| 4,030,018 | 6/1977 | Tsuboi | 363/68 |

*Primary Examiner*—J. D. Miller
*Assistant Examiner*—Peter S. Wong
*Attorney, Agent, or Firm*—Sughrue, Rothwell, Mion, Zinn and Macpeak

[57] ABSTRACT

A power converter is disclosed which is used for converting an a.c. power to a d.c. power or vice versa, and which comprises a first converter unit operated at a variable control angle with phase advanced to an input a.c. source voltage, and a second converter unit operated at a variable control angle with phase lagged to the input a.c. source voltage and having a d.c. side terminal connected in series to that of the first converter unit. At least one additional converter unit having a d.c. side terminal connected in seriesto those of the first and second converter units is further provided in accordance with the invention. The additional converter unit is operated at its bypass mode or a fixed control angle corresponding to the maximum forward or reverse conversion limit. The power converter of the above-mentioned construction enables its output level to be controlled continuously over a wider range without degrading its electric property than the conventional power converter.

9 Claims, 21 Drawing Figures

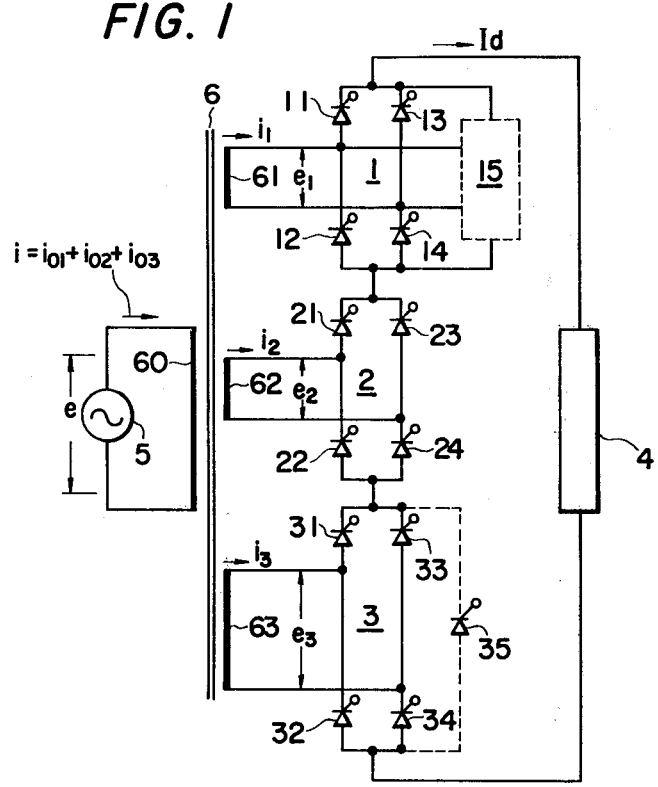
FIG. 1
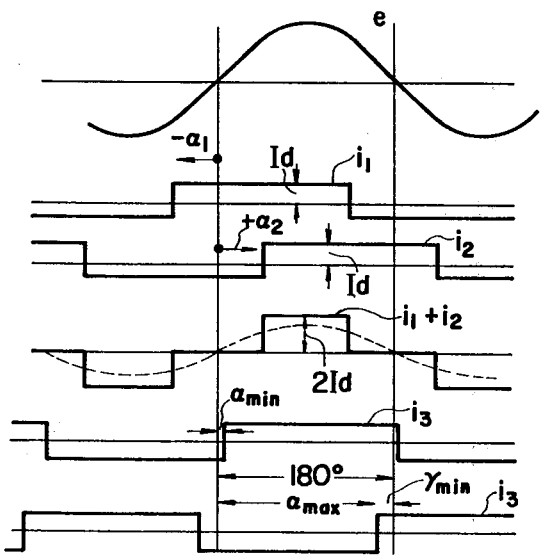
FIG. 2A
FIG. 2B
FIG. 2C
FIG. 2D
FIG. 2E
FIG. 2F

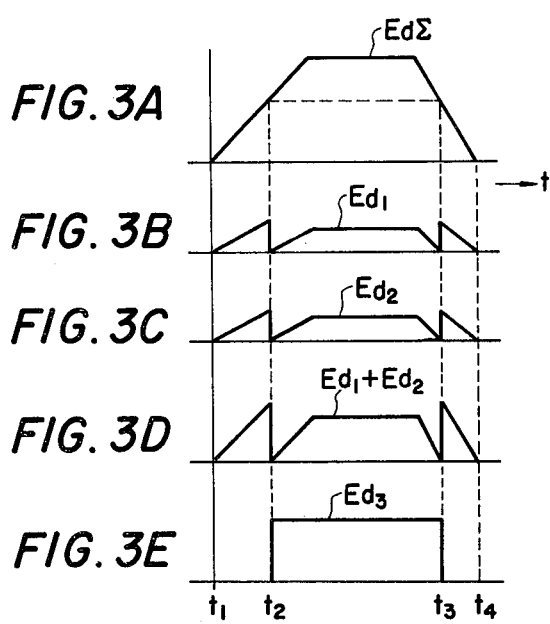
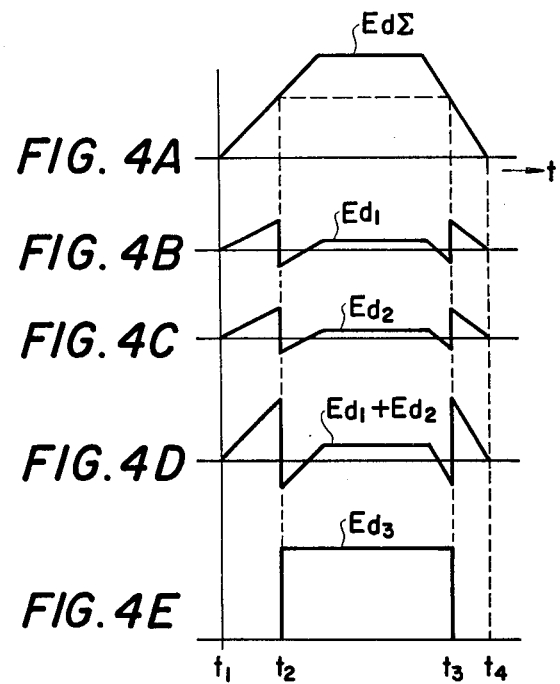
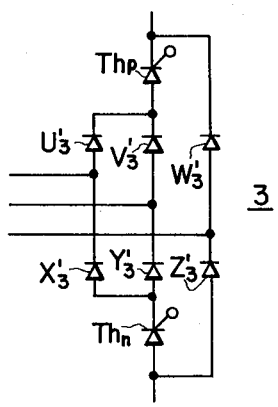
FIG. 6

POWER CONVERTER

BACKGROUND OF THE INVENTION

This invention relates to a power converter which functions to convert an a.c. power into a d.c. power or vice versa and which comprises a pair of converter units to which substantially equal a.c. input voltages are applied from an a.c. power source, the first converter unit being operated at a variable control angle within a range advancing in phase to the a.c. input voltage, and the second converter unit being operated at a variable control angle within a range lagging in phase to the a.c. input voltage and having a d.c. side terminal connected in series to that of the first converter unit.

The power converter of this type is advantageous in that the lagging phase reactive power component produced by the second converter unit is compensated by the advancing phase reactive power component produced by the first converter unit, thereby reducing the total reactive power component generated by the converter. Especially if the absolute value of the control angle for one of the two converter units is made to be substantially equal to that for the other, then one of the two converter units is responsible for one half of the total output voltage while the other is responsible for the other half of the total output voltage, and in addition the fundamental wave power-factor of the converter is totally maintained substantially at 1. Therefore, the power converter of this type is suitable for a power converter of large capacity where the fluctuation of its reactive power component is one of the undesirable factors.

However, the first converter unit operated at a variable control angle within a range advancing in phase to the a.c. input voltage needs the provision of a forced commutation circuit, because in the first converter unit it is impossible to carry out a commutation i.e., the so-called "power source commutation" utilizing the a.c. input voltage. For this reason, the first converter unit should be provided with a forced commutation circuit and also the first converter unit provided with such a forced commutation circuit should have a capacity corresponding to a half of the capacity of the power converter and equal to that of the second converter unit which can attain its commutation operation in the aforesaid power source commutation mode. Therefore, the power converter of the abovementioned construction has a disadvantage that, because of the first converter unit provided with the forced commutation circuit, the larger the capacity thereof, the higher the cost of its equipment. The reduction of the cost of equipment may be achieved if the level of the a.c. input voltage to the first converter unit provided with the forced commutation circuit is made to be lower than that of the a.c. input voltage to the second converter unit thereby to lower the ratio of the capacity of the first converter unit to the total capacity of the power converter. However, in this case, it is impossible to maintain the fundamental wave power-factor of the power converter at about 1.

SUMMARY OF THE INVENTION

An object of this invention is to provide a power converter having a construction as was described in the introductory part of the specification in which the ratio of the capacity of the converter unit provided with the forced commutation circuit to the total capacity of the power converter can be reduced with the fundamental wave power-factor of the power converter maintained at about 1.

The foregoing object of the invention can be achieved by the provision of a power converter such as described in the introductory part, in which at least one additional converter unit is connected at its d.c. side terminal in series together with those of the aforesaid first and second converter units, the additional converter unit being operated as follows: That is, the additional converter unit is operated at a predetermined control angle corresponding to the maximum forward conversion limit or the maximum reverse conversion limit within a range lagging in phase to an a.c. input voltage supplied from an a.c. power source, or is operated in a bypass mode for producing no output therefrom.

Namely when the desired value of the total output voltage from the power converter is within a variable range of the sum of output voltages obtained from the first and second converter units, then the additional converter unit is operated in the bypass mode. On the other hand, when the desired value of the total output voltage is out of the variable range of the sum of output voltages from the first and second converter units, the additional converter unit is operated at an control angle $a_{min}$ or $a_{max}$ (see FIGS. 2E and 2F) corresponding to the maximum forward conversion limit or the maximum reverse conversion limit, and the desired value of the total output voltage is given by the sum of output voltages of the first, second and additional converter units.

During the bypassing operation, the additional converter unit produces no reactive power, because no current flows at the a.c. input side thereof. On the other hand, under the conditions where the additional converter unit produces an output, the aforesaid control angle thereof is maintained at a fixed value which could be regarded as 0° or at a fixed value sufficiently close to 180°, and therefore the reactive power produced thereby is negligibly small.

Accordingly, the power converter according to the invention has the advantage of lowering the ratio of the capacity of the first converter unit provided with the forced commutation circuit to the total capacity of the power converter and controlling its output level continuously over a wider range than the conventional power converter, while maintaining its fundamental wave power-factor at about 1. In other words, if comparison is made of the same power capacity, the power converter of the invention can be manufactured at a cost much lower than the conventional one.

Another merit of the power converter of this invention resides in the following point: In order to avoid the stop of the whole operation of the power converter, when an emergency operation, as seen when a trouble is caused during the period in which the forced commutation circuit of the first converter unit is operated and when the control angle of the first converter unit is switched to be within the range lagging in phase to the a.c. input voltage, is carried out, then the power converter of the invention can minimize the variation of a transient output voltage caused immediately after the switching.

The bypassing operation of the additional converter unit may be conducted by means of a bypass valve connected in parallel with the d.c. side terminal of the additional converter unit. In the case where the additional converter unit is made up of bridge-connected four valve arms, the bypassing operation may be achieved by simultaneously conducting any two valve arms of the bridge which are connected in series to each other.

The power converter according to this invention can be employed as a rectifier for rectifying an a.c. supply voltage and supplying the rectified voltage to a d.c. load and also as an inverter for feeding the energy supplied to the d.c. load back to the a.c. supply. In addition, the power converter of the invention is applicable to the so-called "cycloconverter" in which two power converters of this type are connected, in an anti-parallel relation to each other, to an a.c. load, one of the two power converters being responsible for the positive half of load current, while the other being responsible for the negative half of the load current.

BRIEF DESCRIPTION OF THE DRAWINGS

This invention will be more fully understood from the following description taken in conjunction with the accompanying drawings, in which:

FIG. 1 is a circuit diagram of a power converter embodying the invention;

FIG. 2A to FIG. 4E show practical waveforms of various circuit portions of the power converter shown in FIG. 1;

FIG. 6 shows one modification of an additional converter unit portion of the circuitry of FIG. 1.

DETAILED DESCRIPTION OF THE PREFERRED EMBODIMENTS

Figure 5:
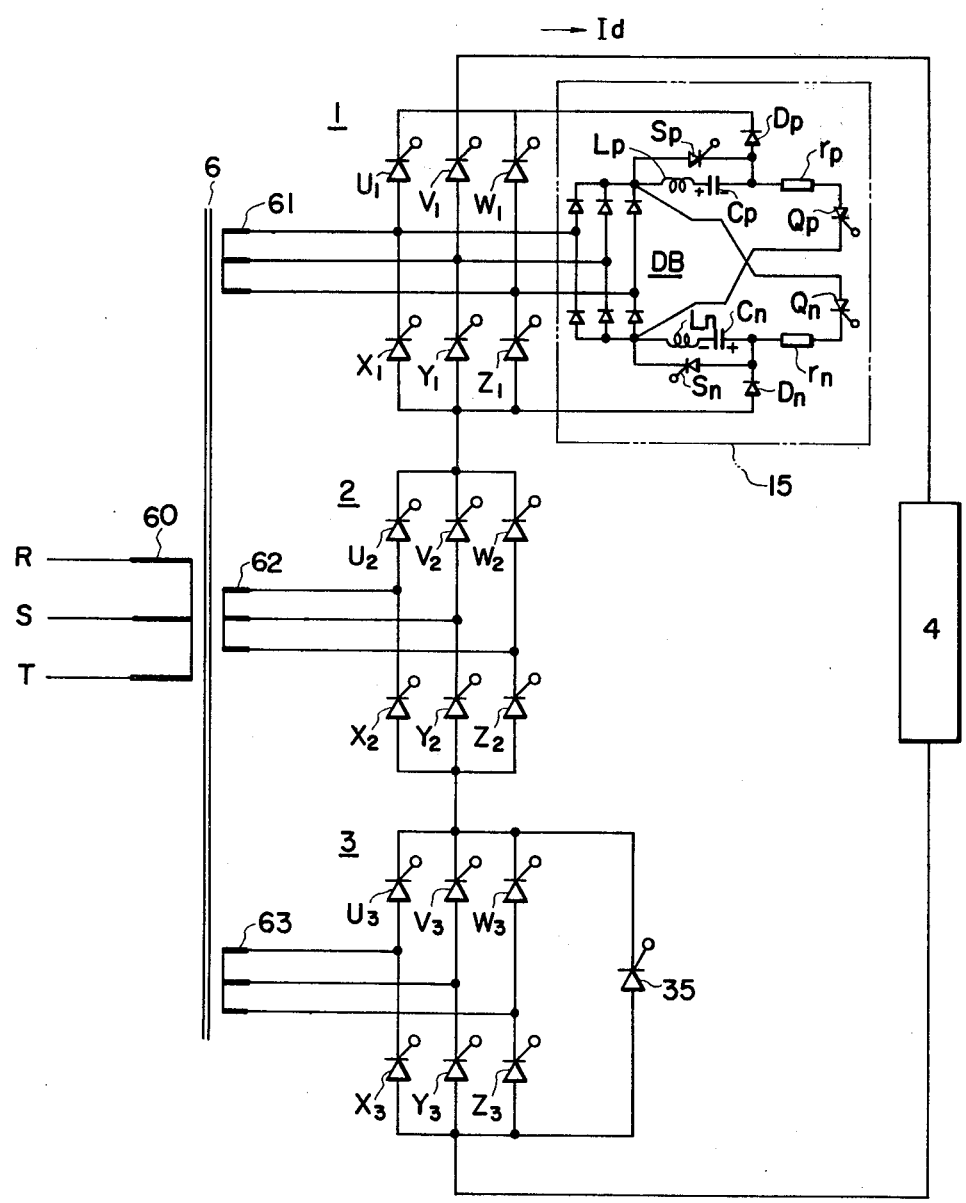
FIG. 5 is a circuit diagram of another power converter embodying the invention.

FIG. 1 is a schematic circuit diagram of a power converter embodying the invention and employed as a rectifier for rectifying an a.c. voltage from a single-phase a.c. power source and supplying the rectified d.c. voltage to a d.c. load: In this embodiment each converter unit is formed by a bridge type thyristor rectifier. A first rectifier 1 comprises bridge-connected four thyristor arms 11 to 14 and is provided with a forced commutation circuit 15. The forced commutation circuit 15 may be a conventional one which includes a commutation capacitor, a commutation reactor and an auxiliary thyristor, etc. A second rectifier 2 is formed of bridge-connected four thyristor arms 21 to 24. Similarly, a third or additional rectifier 3 according to the invention is constructed of bridge-connected four thyristor arms 31 to 34. These three rectifiers 1 to 3 are connected at their output or d.c. terminal sides in series to each other and then connected across a d.c. load 4. The primary winding 60 of a transformer 6 is connected across a single-phase a.c. power source 5. The transformer 6 is provided with three separate secondary windings 61 to 63, to which the input or a.c. terminal sides of the corresponding rectifiers 1 to 3 are connected, respectively.

In the first rectifier 1, each of the thyristors 11 to 14 is triggered ready for its conduction at an control angle $-\alpha_1$ $(0 \leq \alpha_1 \leq 180°)$ within a range advancing to the phase of an a.c. input voltage $e_1$ identical to that of a supply voltage e. If it is assumed that the load 4 is an inductive one, and the load current is sufficiently smoothed to flow continuously through the load 4, then, with respect to the supply voltage e shown in FIG. 2A, a.c. input current $i_1$ and $i_2$ as indicated in FIGS. 2B and 2C will flow with the lapse of time through the respective first and second rectifiers 1 and 2. In this case, it should be noted that a commutation overlapping angle in the a.c. input currents $i_1$ and $i_2$ is disregarded. The waveform of composite current $(i_1+i_2)$ obtained by the sum of the a.c. input currents $i_1$ and $i_2$ of the rectifiers 1 and 2 is shown in FIG. 2D. If the absolute value of the control angle $-\alpha_1$, of the first rectifier 1 is equal to that of the control angle $+\alpha_2$ of the second rectifier 2 $(\alpha_1=\alpha_2=\alpha)$, the fundamental wave component of the composite current $(i_1+i_2)$ will be in phase with the supply voltage e as indicated by a broken line in FIG. 2D. Therefore, if the effective value $E_1$ of the a.c. input voltage $e_1$ of the first rectifier 1 and the effective value $E_2$ of the a.c. input voltage $e_2$ of the rectifier 2 are selected to have the same value, and consequently if the number of turns of the secondary winding 61 is chosen to become equal to that of the secondary winding 62, then the composite value of the reactive power components of the rectifiers 1 and 2 is always kept at zero regardless of the magnitude of the same absolute value of the control angles $-\alpha_1$ and $+\alpha_2$, since the value of composite current $(i_{o1}+i_{o2})$ consisting of the sum of primary current $i_{o1}$ and $i_{o2}$ which flow through the primary winding 60 in response to the secondary currents $i_1$ and $i_2$ flowing through the corresponding secondary windings 61 and 62 is always proportional to the composite secondary current $(i_1+i_2)$ shown in FIG. 2D.

The additional rectifier 3 is further provided with a shunting or bypassing thyristor 35 as indicated by a broken line in FIG. 1. The thyristor 35 is triggered and made conductive for attaining its bypass operation, when the supply of trigger pulses to the thyristors 31 to 34 constituting the rectifier 3 should be blocked to produce no output from the rectifier 3. In this case, load current $I_d$ for the load 4 flows through the conducting thyristor 35 and in consequence no current flows into the secondary winding 63 as well as the thyristors 31 to 34 constituting the rectifier 3, whereby, under this condition, the rectifier 3 produces no reactive power. The thyristors 31 to 34 constructing the rectifier 3 are simultaneously triggered ready for their conductions at a fixed control angle $\alpha$ min corresponding to the maximum forward conversion limit when the rectifier 3 should produce an output. FIG. 2E shows a practical waveform of a.c. input current $i_3$ flowing with the lapse of time into the rectifier 3 at this time. As shown in FIG. 2E, the current $i_3$ lags in phase to the supply voltage e by the angle $\alpha$ min. However, since this control angle $\alpha$ min is selected to be substantially 0°, the reactive power component of the rectifier 3 under this condition has a considerably small value and is almost negligible.

In the cases where the power converter of FIG. 1 is required such a reverse conversion operation that the energy of the load 4 is fed back to the power supply 5 and where the desired value of the total output voltage of the power converter exceeds the sum of the maximum reverse conversion outputs of the first and second rectifiers 1 and 2, then the additional rectifier 3 is operated at a fixed control angle $\alpha_{max}(=180°-\gamma_{min})$ corresponding to the maximum reverse conversion limit. FIG. 2F shows a practical waveform of a.c. input current $i_3$ flowing into the rectifier 3. In this case, if the fixed control angle $\alpha_{max}$ is chosen to approach 180° as close as possible within a range where the commutation operation of the rectifier 3 is positively obtained, then the reactive power component produced by the rectifier 3 can be kept at a sufficiently low level.

In the embodiment of FIG. 1, the bypass operation of the rectifier is carried out by the thyristor 35. However, the bypass operation may be achieved by simultaneously firing either two series-connected thyristor arms 31 and 32 or 33 and 34 instead of the thyristor 35. In this case, the two thyristor arms used for the bypass operation should have a current capacity corresponding to twice that in the embodiment of FIG. 1. However, if it is undesirable to provide the thyristor arms of such large current capacity, the aforesaid bypass operation may be achieved by firing, any series-connected two thyristor arms, e.g., 31 and 32, constituting one half of the bridge, at the control angle $\alpha_{min}$ ($\approx 0$) corresponding to the maximum forward conversion limit and by firing, the remaining thyristors arms 33 and 34 constituting the other half of the bridge, at the control angle $\alpha_{max}$ (= 180° − $\alpha_{min}$) corresponding to the maximum reverse conversion limit. At this time, the thyristor arms 31 and 32 serve as a bypass operation valve for the positive half period of the a.c. input voltage $e_3$, and the thyristor arms 33 and 34 as a bypass operation valve for the negative half period thereof. In this case, the arms 31 and 32 and the arms 33 and 34 share equally the load current bypassing the rectifier 3 in a time averaged manner. It should be noted, that, for the extremely short period ($\alpha_{min} + \gamma_{min}$) between the positive half period and the negative half period, the load current is not bypassed and is allowed by flow through the secondary winding 63. However, since this period ($\alpha_{min} + \gamma_{min}$) is extremely short, the output property of the power converter will be scarcely degraded.

The relationship, between the d.c. output voltages (mean value) $E_{d1}$, $E_{d2}$ and $E_{d3}$ of the rectifiers, 1, 2 and 3 and the total output voltage $E_{d\Sigma}$ of the power converter will be described with reference to FIGS. 3A to 4E.

Assuming that the effective values of the a.c. input voltages $e_1$, $e_2$ and $e_3$ of the rectifiers 1, 2 and 3 are represented by $E_1$, $E_2$ and $E_3$, that the load current $I_d$ flows continuously, and that the commutation overlapping angle is negligible, then the respective d.c. output voltages $E_{d1}$ to $E_{d3}$ can be expressed by the following equations (1) to (3):

$$E_{d1} = K \cdot E_1 \cos \alpha_1 \quad (1)$$

$$E_{d2} = K \cdot E_2 \cos \alpha_2 \quad (2)$$

$$E_{d3} = 0 \text{ or } K \cdot E_3 \cos \alpha_{min} \text{ or } K \cdot E_3 \cos \alpha_{max} \quad (3)$$

Where K is a constant, and in the embodiment of FIG. 1, $K = 2\sqrt{2}/\pi$. As was described above, the absolute value of the control angle $-\alpha_1$ of the first rectifier 1 and the absolute value of the control angle $+\alpha_2$ of the second rectifier 2 are maintained substantially equal to each other, and consequently, $\alpha_1 = \alpha_2 = \alpha$ ($0 \le \alpha \le 180°$); and the effective values $E_1$ and $E_2$ (see FIGS. 3B and 3C) of the respective rectifiers 1 and 2 are selected to be almost equal to each other, and consequently, $E_1 = E_2 = E$. Under these conditions, the effective value $E_3$ of the a.c. input voltage of the additional rectifier 3 is set to be equal to nE ($E_3 = nE$). In this case, the sum $E_{d1} + E_{d2}$ of the output voltages of the rectifiers 1 and 2 is continuously variable within the following range:

$$-2KE < E_{d1} + E_{d2} = 2KE \cos \alpha \le 2KE$$

FIGS. 3A to 3E show the processes of obtaining the desired value of the total output voltage $E_{d\Sigma}$ (see FIG. 3A) which is supplied from the a.c. input power source 5 via the rectifiers 1 to 3 to the load 4, in the case where the maximum value 2KE of the aforesaid voltage sum $E_{d1} + E_{d2}$ (see FIG. 3D) is substantially equal to the value nKE cos $\alpha_{max}$ ($\approx$ nKE) at the control angle $\alpha_{max}$ ($\approx 0$) of the output voltage $E_{d3}$ (see FIG. 3E) of the additional rectifier 3, and in consequence n=2. If the desired value of the aforesaid total output voltage $E_{d\Sigma}$ (FIG. 3A) is of a trapezoid variation, then the value of the total output voltage $E_{d\Sigma}$ required for the power converter is given only by the aforesaid voltage sum $E_{d1} + E_{d2}$ derived from the first and second rectifiers 1 and 2 during the period (in FIG. 3, $t_1 \le t \le t_2$, and $t_3 \le t \le t_4$) in which the value of the total output voltage $E_{d\Sigma}$ is not more than the maximum value 2KE of the aforesaid voltage sum $E_{d1} + E_{d2}$, and the rectifier 3 is in an outputless state through its bypass operation. When, on the other hand, the desired value of the total output voltage $E_{d\Sigma}$ exceeds the maximum value 2KE of the voltage sum $E_{d1} + E_{d2}$ i.e., at the time of $t_2 \le t \le t_3$, the rectifier 3 is operated at the fixed control angle $\alpha_{max}$, and the total output voltage $E_{d\Sigma}$ is given by the sum of a fixed output voltage ($\approx$ 2KE) of the rectifier 3 and the variable voltage sum $E_{d1} + E_{d2}$. In such a manner as described above, the total output voltage $E_{d\Sigma}$ can be continuously varied.

The power capacity ratio of the rectifiers 1, 2 and 3 may be represented as follows:

$$E_1 I_d : E_2 I_d : E_3 I_d = E_1 : E_2 : E_3$$
$$= E : E : nE$$
$$= 1 : 1 : n$$

Therefore, the ratio of the capacity of the rectifier 1 provided with the forced commutation circuit 15 to the total capacity of the power converter can be expressed as follows: $1/(2+n) < 0.5$. This ratio is 0.25 in the embodiment (see FIGS. 3A to 3E). In other words, when the maximum value of the aforesaid voltage sum $E_1 + E_2$ is chosen to become substantially equal to the maximum value of the voltage $E_{d3}$ of the rectifier 3, the capacity of the first rectifier 1 provided with the forced commutation circuit 15 can reduce ¼ of the total capacity of the power converter.

The capacity of the rectifier 3 may be selected to have a larger value than two times the capacity of the rectifier 1. FIGS. 4A to 4E show practical waveforms derived from the various circuit portions of FIG. 1 where said n is about 3 (n $\approx$ 3). When the desired value of the total output voltage $E_{d\Sigma}$ is not more than the maximum value 2KE of the aforesaid voltage sum $E_{d1} + E_{d2}$ (in FIG. 4, $t_1 \le t \le t_2$, and $t_3 \le t \le t_3$), there is no difference between this case and the case of FIG. 3. When, however, the desired value of the total output voltage $E_{d\Sigma}$ exceeds the maximum value 2KE of the aforesaid voltage sum $E_{d1} + E_{d2}$, a range, where the fixed maximum output voltage $E_{d3}$ (see FIG. 4E) of the rectifier 3 exceeds the desired value of the total output voltage $E_{d\Sigma}$, exists. In this range, the first and second rectifiers 1 and 2 are operated within a reverse conversion region (in the embodiment, 90° < $\alpha$ < 180°) so that they produce negative output voltages, thereby to compensate the above-mentioned excessive voltage component. In this case, it will be evident that the required power capacity of the rectifier 1 can be reduced to have a smaller value than that in the case of FIG. 3. However, the power capacity of the additional rectifier 3 provided in accordance with the invention should be chosen to have a smaller value than four times the capacity of the first rectifier 1, because it would be otherwise impossible continuously to vary the level of the total output voltage $E_{d\Sigma}$ over the whole range. If it is necessary to make the ratio of the capacity of the rectifier 1 to the total capacity of the power converter further smaller, a second additional rectifier identical in construction to the rectifier 3 may be connected in series to the rectifier 3 so that the sum of the output voltages of these additional rectifiers is varied stepwise. For instance, if the capacity of the first additional rectifier 3 is chosen to have a value equal to two times that of the rectifier 1 while the capacity of the second additional rectifier is set to have a value equal to four times that of the rectifier 1, then the capacity of the rectifier 1 provided with the forced commutation circuit 15 can be reduced one eighth (⅛) of the total capacity of the power converter.

In the case where no regenerating operation is required in the embodiment of FIG. 1, the thyristors 33 and 34 in the rectifier 3 may be replaced by conventional diodes. In this case, the diodes each serve as the bypassing valve, thus eliminating the provision of the thyristor 35.

FIG. 5 shows a schematic circuit diagram of another power converter embodying the invention, which is constructed as a rectifier device for supplying rectified voltage from a three-phase a.c. power source to a d.c. load.

In the embodiment of FIG. 5, the power converter units 1 to 3 respectively comprise bridge-connected four thyristors $U_1$ to $Z_1$, $U_2$ to $Z_2$ and $U_3$ to $Z_3$. The first converter unit 1 is provided with a forced commutation circuit 15, and the additional converter unit 3 provided in accordance with the invention, with a thyristor 35 acting as a bypassing valve. The converter units 1 to 3 are connected at their d.c. terminal sides in series to each other and then connected to a d.c. load 4. The a.c. terminal sides of the converter units 1 to 3 are connected respectively to the secondary windings 61, 62 and 63 of a transformer 6, the primary winding 60 of which is connected to a three-phase (R, S, T) a.c. power source.

The construction and operation of the converter units 1 to 3 are the same as those of FIG. 1, excepting that the a.c. power source is replaced from a single-phase type to a three-phase type, and the description thereof is omitted. Accordingly, only the arrangement and operation of the forced commutation circuit 15 will be described hereinunder.

The forced commutation circuit 15 installed in the first converter unit 1 includes one commutation capacitor $C_P$ common to the thyristors $U_1$ to $W_1$ constituting one half of the bridge, and another commutation capacitor $C_n$ common to the thyristors $X_1$ to $Z_1$ constituting the other bridge half. Commutation reactors $L_p$ and $L_n$ are connected in series to the corresponding commutation capacitors $C_p$ and $C_n$. Thyristors $S_p$ and $S_n$ for reverse operation are connected in parallel to the corresponding series circuits. One end of the series circuit consisting of $L_p$ and $C_p$ is connected to the d.c. side negative terminal of a diode bridge DB having its a.c. side terminals connected, together with the a.c. side terminals of the main thyristor bridge $U_1$–$Z_1$ constituting the first converter unit 1, to a secondary winding 61.

The other end of the series circuit is connected via a reverse current blocking diode $D_p$ to the d.c. side negative terminal of the main thyristor bridge $U_1$–$Z_1$. Similarly, one end of the other series circuit consisting of $L_n$ and $C_n$ is connected to the d.c. side positive terminal of the diode bridge DB, while the other end of the series circuit is connected via a reverse current blocking diode $D_n$ to the d.c. side positive terminal of the main thyristor bridge $U_1$–$Z_1$. The junction point of the capacitor $C_p$ and the diode $D_p$ is connected via a series circuit consisting of a damping resistor $r_p$ and a supplementary charging thyristor $Q_p$ to the d.c. side positive terminal of the diode bridge DB. Similarly, a series circuit formed of a damping resistor $r_n$ and a supplementary charging thyristor $Q_n$ is connected between the junction point of the capacitor $C_n$ and the diode $D_n$ and the d.c. side negative terminal of the diode bridge DB. The diode bridge DB serves not only as a commutation path for the respective thyristors $U_1$ to $Z_1$ but also as a recharging source for the supplementary charge of each of the capacitors $C_p$ and $C_n$. Namely, by firing the supplementary charging thyristors $Q_p$ and $Q_n$, the commutation capacitors $C_p$ and $C_n$ are charged to sufficiently high voltages with their polarities as indicated, preparing the next operation.

For instance, in the case where the load current being fed to the load 4 is to be commutated from the main thyristor $W_1$ to the main thyristor $U_1$, the charging polarity of the commutation capacitor $C_p$ is first reversed through the firing of the thyristor $S_p$, and upon completion of the charging polarity reverse operation of the commutation capacitor $C_p$, the load current being flown through the main thyristor $W_1$ is transmitted to the commutation capacitor $C_p$ via the corresponding one of the diodes forming the diode bridge DB. Upon completion of this transmission, no current flows into the main thyristor $W_1$, and the thyristor $W_1$ is rendered nonconductive. Thereafter, the commutation capacitor $C_p$ is recharged by the load current flowing therethrough, with the polarity indicated in the figure. When the commutation capacitor $C_p$ is charged to a voltage level which exceeds the line voltage applied between the a.c. side terminal of the main thyristor $W_1$ and the a.c. side terminal of the main thyristor $U_1$, then the terminal voltage of the main thyristor $U_1$ should have the forward polarity. If, at this time, a trigger pulse is applied to main thyristor $U_1$, this main thyristor is rendered conductive to receive the load current which has been shifted once into the commutation circuit 15. For the next commutating operation, the supplementary charging thyristor $Q_p$ is triggered and made conductive to carry out the supplementary charging of the commutation capacitor $C_p$.

Owing to the forced commutation circuit 15, the first converter unit 1 can be made operative at a control angle advancing in phase to the a.c. input voltage e.

The converter unit 3 which is operated at a control angle $\alpha_{min}$ or $\alpha_{max}=180°-\gamma_{min}$ corresponding to the maximum forward conversion limit or the maximum reverse conversion limit which is placed in an outputless state through the bypass behavior, may be simplified as shown in FIG. 6, when an operation mode of regenerating the energy of the load 4 to the three-phase a.c. power source is not required. In FIG. 6, the converter unit 3 is comprised of diodes $U_3'$ to $Z_3'$ and thyristor switches $Th_p$ and $Th_n$. When the thyristor switches $Th_p$ and $Th_n$ are simultaneously fired, the converter unit 3 produces the maximum forward conversion output voltage. When, on the other hand, the application of a trigger pulse to the thyristor switch Th$_p$ is blocked, the load current is bypassed through the diodes W$_3'$ and Z$_3'$.

The embodiments of FIGS. 1 and 5 each show the application of a power converter in accordance with invention to a rectifier which functions to convert an a.c. power into a d.c. power and supply the resultant d.c. power to a d.c. load. Additionally, it will be apparent to those skilled in the art that the power converters of the invention are applicable, if they are anti-parallel-connected to an a.c. load, to a cycloconverter as hereinunder described.

Figure 7:
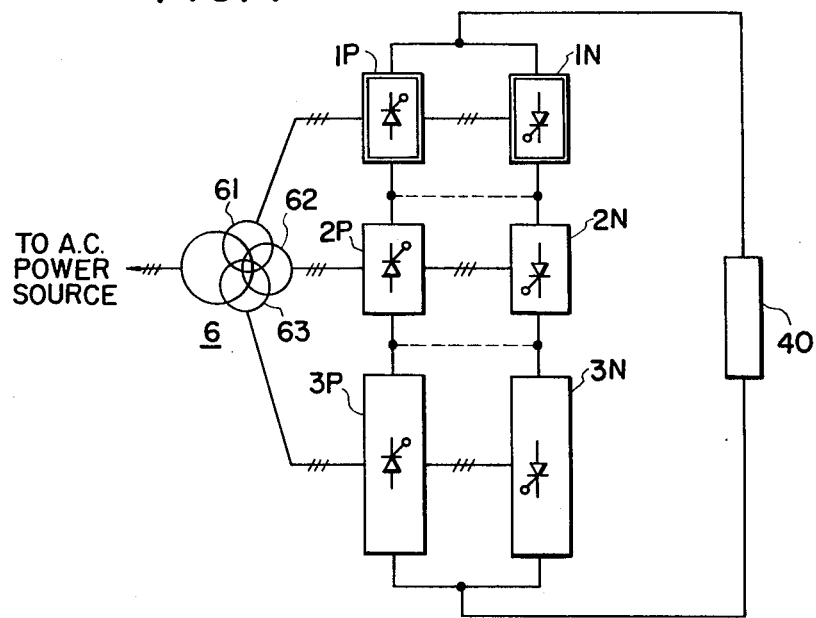
FIGS. 7 and 8 are circuit diagrams of different power converters of the invention each employed as a cycloconverter.
Figure 8:
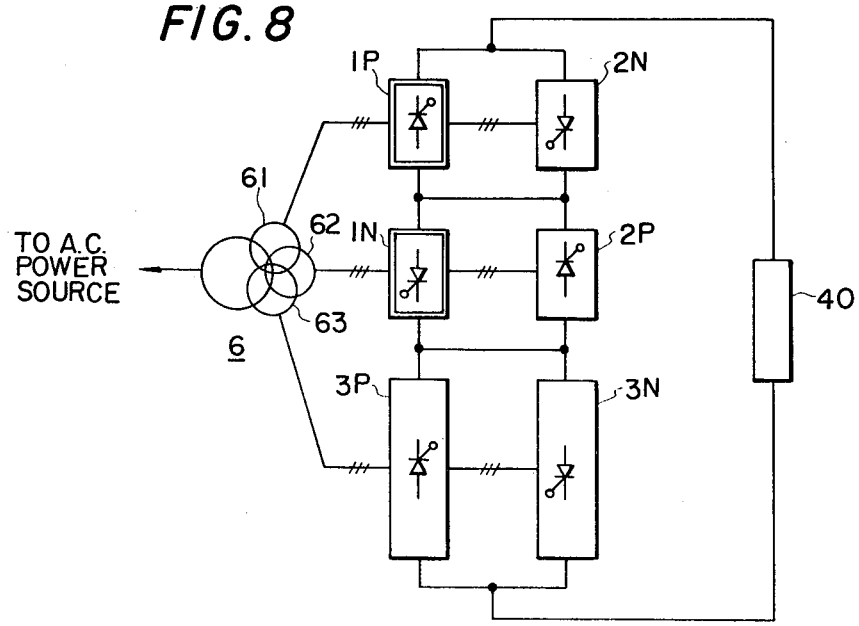

FIGS. 7 and 8 show different embodiments of the power converter according to the invention which is formed as a cycloconverter.

In FIGS. 7 and 8, the cycloconverter device is made up of a first group of converter units 1P, 2P and 3P which are provided for the positive half current portion of an a.c. load 40 (a single phase load or a load corresponding to one phase of the polyphase load), and a second group of converter units 1N, 2N and 3N which are provided for the negative half current portion of the load 40. The converter units 1P and 1N correspond to the forced commutation converter unit 1 in the embodiment of FIG. 5, the converter units 2P and 2N to the power source commutation converter unit 2 in FIG. 5, and the converter units 3P and 3N to the power source commutation converter unit 3 in FIG. 5.

In the embodiment of FIG. 7, the forced commutation converter units 1P and 1N are connected to a secondary winding 61 of a power transformer 6, the power source commutation converter units 2P and 2N to a secondary winding 62 of the transformer 6, and the power source commutation converter units 3P and 3N to a secondary winding 63 of the transformer 6. When one group of converter units which correspond to one of the positive and negative halves of the load current are made operative, in order that the individual converter units included in the other group of converter units which correspond to the other load current half and which are set at an inoperative state share the applied voltage in proportion to their voltage capacities, it is preferable that the converter units 1P and 1N, 2P and 2N, and 3P and 3N are respectively parallel-connected at their output terminal sides as indicated in FIG. 7 by broken lines.

The cycloconverter of FIG. 8 has the same construction as that of FIG. 7, excepting that the forced commutation converter unit 1P and the power source commutation converter unit 2N are connected to the secondary winding 61, while the forced commutation converter unit 1N and the power source commutation converter unit 2P are connected to the secondary winding 62.

As is apparent from the above, a power converter constructed in accordance with the invention has an advantage of enabling the ratio of the power capacity of the converter unit provided with the forced commutation circuit to the total power capacity of the converter to make a smaller than that in the conventional power converter, without affecting the continuous variation capability on the total output voltage and without almost degrading the fundamental wave power-factor. Accordingly, the manufacturing cost for the power converter can be markedly lowered.

What is claimed is:

1. A power converter comprising a first converter unit and a second converter unit which are connected in series to each other at their output terminal sides and to which substantially equal a.c. input voltages are applied from an a.c. power source, the first converter unit being operated at a variable control angle within a range advancing in phase to the a.c. input voltage, and the second converter unit being operated at a variable control angle within a range lagging in phase to the a.c. input voltage, the improvement wherein at least one additional converter unit is connected at its output terminal side in series to the first and second converter units, said additional converter unit being operated at a fixed control angle corresponding to a maximum forward conversion limit or a maximum reverse conversion limit within a range lagging in phase to the a.c. input voltage applied thereto from the a.c. power source, or being set in an outputless mode through by-passing means.

2. The power converter claimed in claim 1, wherein when a desired value of a total output voltage of said power converter is within a variable range of the sum of output voltages of the first and second converter units, said additional converter unit is set in the outputless mode, whereas, when said desired value of the total output voltage is out of said variable range of the sum of output voltages of the first and second converter units, said additional converter unit is so operated at said fixed control angle that it produces an output voltage having a level equal to the difference between said desired value of the total output voltage and the sum of output voltages of the first and second converter units.

3. The power converter claimed in claim 1, wherein the power converter is formed as a rectifier device for converting an a.c. power applied thereto from the a.c. power source into a d.c. power and supplying the d.c. power to a d.c. load.

4. The power converter claimed in claim 1, wherein the power converter is formed as a cycloconverter.

5. The power converter claimed in claim 1, wherein the bypassing means for said additional converter unit comprises a bypass valve connected in parallel to the output terminal side of said additional converter unit.

6. The power converter claimed in claim 5, wherein said additional converter unit comprises bridge-connected four conversion valves, and the bypassing means comprises any two of said bridge-connected conversion valves which are connected in series to each other.

7. The power converter claimed in claim 1, wherein said additional converter unit comprises bridge-connected four controllable conversion valves, and the bypass operation of the bypassing means is carried out by firing.

8. A power converter as defined in claim 1, wherein a forced commutation circuit is connected across the output of said first conversion unit.

9. A power converter as defined in claim 1, wherein the absolute values of the variable control angles of said first and second converter units are equal.

* * * * *